United States Patent
Kiyokawa et al.

(10) Patent No.: US 9,853,688 B2
(45) Date of Patent: Dec. 26, 2017

(54) BICYCLE COMPONENT AND BICYCLE COMMUNICATION SYSTEM

(71) Applicant: Shimano Inc., Sakai, Osaka (JP)

(72) Inventors: Kanako Kiyokawa, Osaka (JP); Ayumi Kato, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/928,377

(22) Filed: Oct. 30, 2015

(65) Prior Publication Data

US 2016/0156385 A1 Jun. 2, 2016

(30) Foreign Application Priority Data

Nov. 28, 2014 (JP) ................................ 2014-241541

(51) Int. Cl.

| H04L 27/00 | (2006.01) |
|---|---|
| H04B 1/38 | (2015.01) |
| H04L 7/00 | (2006.01) |
| H04B 3/54 | (2006.01) |
| B62M 23/00 | (2006.01) |
| H04N 7/18 | (2006.01) |
| B62M 25/08 | (2006.01) |

(52) U.S. Cl.
CPC ............... *H04B 3/54* (2013.01); *B62M 23/00* (2013.01); *B62M 25/08* (2013.01); *H04N 7/181* (2013.01)

(58) Field of Classification Search
USPC ....... 375/219, 220, 222, 259, 295, 316, 354, 375/356; 455/39, 500, 502, 91, 130; 370/276, 277, 278, 310, 350
See application file for complete search history.

(56) References Cited

U.S. PATENT DOCUMENTS

| 5,534,847 | A | * | 7/1996 | McGregor | ............... | B62H 5/20 |
|---|---|---|---|---|---|---|
| | | | | | | 340/427 |
| 6,453,262 | B1 | * | 9/2002 | Kitamura | ............... | B62M 25/00 |
| | | | | | | 324/160 |
| 8,874,338 | B2 | * | 10/2014 | Miglioranza | ............ | B62M 9/122 |
| | | | | | | 180/218 |
| 9,150,272 | B1 | * | 10/2015 | Thompson | ............ | B62K 15/008 |
| 9,191,038 | B2 | * | 11/2015 | Abe | ..................... | G08C 17/00 |
| 9,371,103 | B2 | * | 6/2016 | Fujii | ..................... | B62M 9/122 |
| 9,561,836 | B2 | * | 2/2017 | Thompson | ............... | B62M 6/45 |

(Continued)

FOREIGN PATENT DOCUMENTS

| JP | 2004-325783 A | 11/2004 |
|---|---|---|
| JP | 2011-230714 A | 11/2011 |

OTHER PUBLICATIONS

CustomCable.ca, "Wired vs. Wireless Connections", Dec. 11, 2011, https://CustomCable.ca/wired-vs-wireless/, pp. 1-5.*

*Primary Examiner* — Linda Wong
(74) *Attorney, Agent, or Firm* — Global IP Counselors, LLP (57) ABSTRACT

A bicycle component is basically provided with a controller, a first connection part and a second connection part. The first connection part is connected to a first transmission path configured to transmit electromagnetic waves. The second connection part is connected to a second transmission path configured to transmit electricity. The controller is configured to establish a communication path with other bicycle components through the first transmission path by communicating with the other bicycle components via the second transmission path.

12 Claims, 6 Drawing Sheets

(56) References Cited

U.S. PATENT DOCUMENTS

| | | | |
|---|---|---|---|
| 2007/0042868 A1* | 2/2007 | Fisher | A63B 24/0084 482/8 |
| 2008/0207402 A1* | 8/2008 | Fisher | A63B 21/0051 482/5 |
| 2008/0297108 A1* | 12/2008 | Le Gars | H01M 10/441 320/109 |
| 2009/0170660 A1* | 7/2009 | Miglioranza | A63B 24/00 482/1 |
| 2012/0186922 A1* | 7/2012 | Battlogg | B62K 25/04 188/267.1 |
| 2013/0090195 A1* | 4/2013 | Yamaguchi | B60T 7/102 474/80 |
| 2014/0171266 A1* | 6/2014 | Hawkins, III | A63B 24/0087 482/5 |
| 2014/0273858 A1* | 9/2014 | Panther | A61B 5/0002 455/41.2 |
| 2014/0282783 A1* | 9/2014 | Totten | H04L 12/2885 725/111 |
| 2014/0318306 A1* | 10/2014 | Tetsuka | B62M 25/08 74/502.2 |
| 2014/0358387 A1* | 12/2014 | Cracco | B62M 9/122 701/51 |
| 2015/0009019 A1* | 1/2015 | Watarai | B62J 1/08 340/12.5 |
| 2015/0023339 A1* | 1/2015 | Erickson | H04W 52/0212 370/338 |
| 2015/0180517 A1* | 6/2015 | Abe | G08C 17/00 455/99 |
| 2015/0203169 A1* | 7/2015 | Nishino | B62K 23/06 74/491 |
| 2015/0311954 A1* | 10/2015 | Tetsuka | H04B 5/0081 307/104 |
| 2016/0016630 A1* | 1/2016 | Thompson | B62K 15/008 280/287 |
| 2016/0016634 A1* | 1/2016 | Thompson | B62K 15/008 301/124.2 |
| 2016/0059933 A1* | 3/2016 | Miki | B62K 23/06 74/502.2 |
| 2016/0152302 A1* | 6/2016 | Nishino | B62M 25/08 701/2 |

* cited by examiner

BICYCLE COMPONENT AND BICYCLE COMMUNICATION SYSTEM

CROSS-REFERENCE TO RELATED APPLICATIONS

This application claims priority to Japanese Patent Application No. 2014-241541, filed on Nov. 28, 2014. The entire disclosure of Japanese Patent Application No. 2014-241541 is hereby incorporated herein by reference.

BACKGROUND

Field of the Invention

This invention generally relates to a bicycle component and a bicycle communication system. More specifically, the present invention relates to a component that is configured to be mounted to a bicycle and a bicycle communication system comprising a plurality of bicycle components.

Background Information

Some bicycles are provided with a bicycle communication system that communicates between a plurality of bicycle components of a bicycle using power line communication technology (see, Japanese Laid-Open Patent Publication No. 2011-230714). In such conventional communication system, the bicycle components of the bicycle include, for example, a gear shifting device, a shifting operating device and a display device of a bicycle. Each of the bicycle components typically comprises a power line communication unit, and each comprises a connection part that is connected to a transmission path that transmits electricity. Control signals and display signals are mainly transmitted between the bicycle components by power lines via the connection parts.

SUMMARY

Currently, there is a demand for a bicycle communication system that is capable of high-speed communication of large volumes of data such as, for example, video data, In this disclosure, a bicycle component and a communication system are discussed that are capable of carrying out high-speed communication.

In view of the state of the known technology and in accordance with a first aspect of the present disclosure, a bicycle component is provided that basically comprises a controller, a first connection part and a second connection part, The first connection part is connected to a first transmission path configured to transmit electromagnetic waves. The second connection part is connected to a second transmission path configured to transmit electricity. The controller is configured to establish a communication path with other bicycle components through the first transmission path by communicating with the other bicycle components via the second transmission path.

In accordance with a second aspect of the present invention, the bicycle component according to the first aspect is configured so that the first connection part comprises an optical communication unit configured to conduct optical communication with the other bicycle components via the first transmission path.

In accordance with a third aspect of the present invention, the bicycle component according to the second aspect is configured so that the optical communication unit comprises a light transmission unit configured to transmit light to the other bicycle components and a light reception unit configured to receive light from the other bicycle components.

In accordance with a fourth aspect of the present invention, the bicycle component according to the first aspect is configured so that the second connection part comprises a power line communication unit configured to conduct power line communication with the other bicycle components via the second transmission path.

In accordance with a fifth aspect of the present invention, the bicycle component according to the first aspect is configured so that the controller is configured to transmit a request regarding an establishment of a communication path to the other bicycle components via the second transmission path. Also the controller is configured to establish the communication path in the first transmission path upon receiving permission for the request from the other bicycle components. The controller is further configured to communicate with the other bicycle components via the established communication path.

In accordance with a sixth aspect of the present invention, a bicycle component is provided that basically comprises a controller, a first connection part and a wireless communication unit. The first connection part is connected to a first transmission path configured to transmit electromagnetic waves. The controller is configured to establish communication path with the other bicycle components in the first transmission path by communicating with the other bicycle components via the wireless communication unit.

In accordance with a seventh aspect of the present invention, the bicycle component according to the sixth aspect is configured so that the controller is further configured to transmit a request regarding an establishment of a communication path to the other bicycle components via the wireless communication unit. The controller is further configured to establish the communication path in the first transmission path upon receiving permission for the request from the other bicycle components. The controller is configured to communicate with the other bicycle components via the established communication path.

In accordance with an eighth aspect of the present invention, a bicycle communication system is provided that basically comprises a first bicycle component and a second bicycle component. The first bicycle component comprises a first controller, a first connection part and a second connection part. The first connection part is connected to a first transmission path configured to transmit electromagnetic waves. The second connection part is connected to a second transmission path configured to transmit electricity. One of the first and second controllers is configured to establish the communication path in the first transmission path by communicating with the other of the first and second controllers via the second transmission path.

In accordance with a ninth aspect of the present invention, the bicycle communication system according to the eighth aspect further comprises a third bicycle component and a communication path. The third bicycle component comprises a third controller, a fifth connection part and a sixth connection part. The fifth connection part is connected to a third transmission path configured to transmit electromagnetic waves. The sixth connection part is connected to a fourth transmission path configured to transmit electricity.

In accordance with a tenth aspect of the present invention, the bicycle communication system according to the ninth aspect is configured on that at least a last of the first transmission path and the third transmission path overlap.

In accordance with an eleventh aspect of the present invention, the bicycle communication system according to the ninth aspect is configured so that at least a part of the second transmission path and the fourth transmission path overlap.

In accordance with a twelfth aspect of the present invention, the bicycle communication system according to the ninth aspect further comprises a connection mechanism and a connection control apparatus. The connection mechanism is configured to connect to each of the first to sixth connection parts. The connection control apparatus comprises a connection controller configured to control the connection state between the first, second and third bicycle components.

In accordance with a thirteenth aspect of the present invention, the bicycle communication system according to the first aspect further comprises a fourth bicycle component. The fourth bicycle component includes a fourth controller and a seventh connection part that is connected to a fifth transmission path configured to transmit electricity. The connection mechanism is configured to connect to each of the first to seventh connection parts. The connection controller controls the connection state between the first to fourth bicycle components.

In accordance with a fourteenth aspect of the present invention, the bicycle communication system according to the thirteenth aspect is configured so that at least a part of the fifth transmission path overlaps with at least one the second and the fourth transmission paths.

Also other objects, features, aspects and advantages of the disclosed bicycle component and the disclosed bicycle communication system will become apparent to those skilled in the art from the following detailed description, which, taken in conjunction with the annexed drawings, discloses illustrative embodiments of the bicycle component and the bicycle communication system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
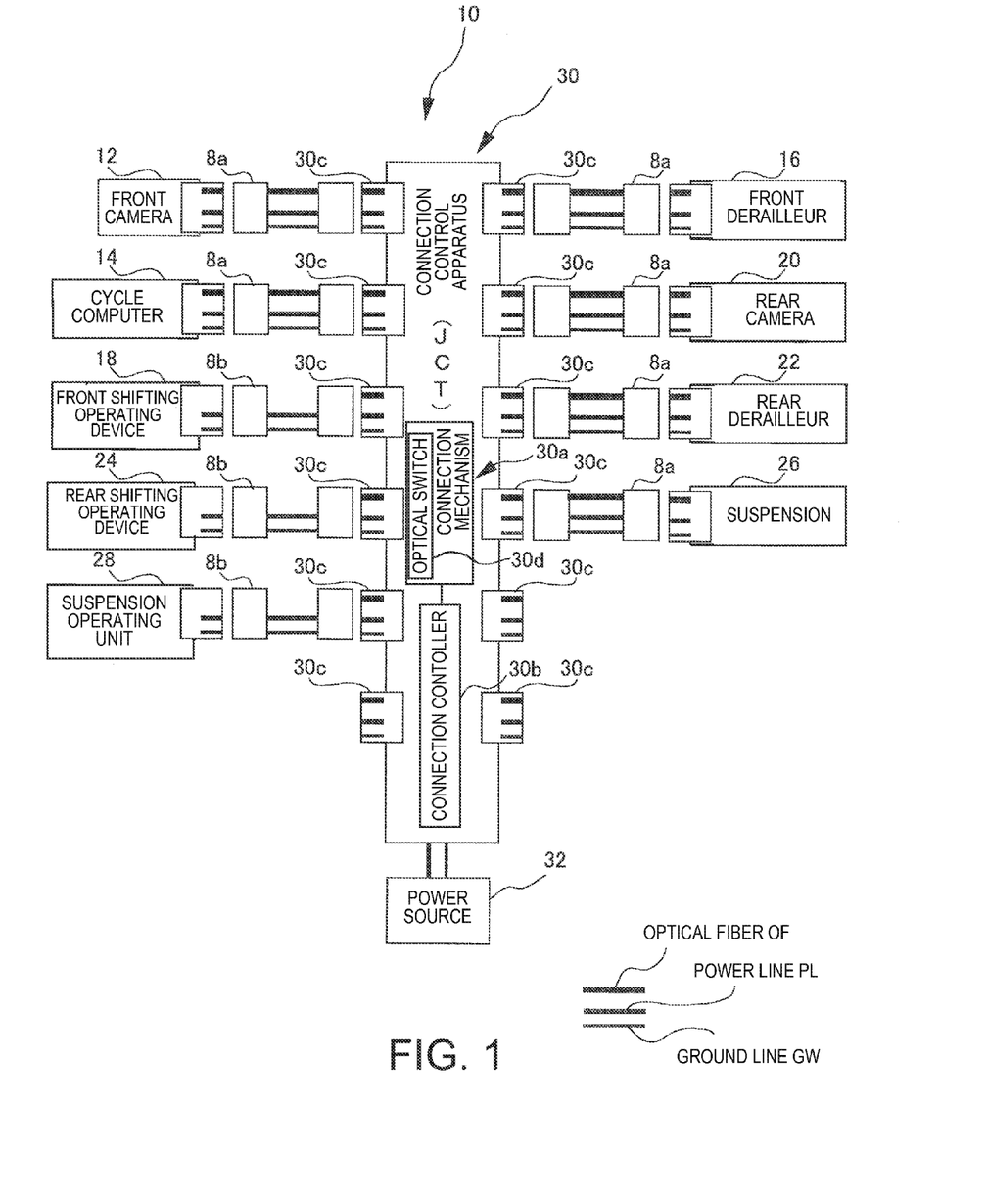
FIG. 1 is a block diagram schematically illustrating an overall system configuration of a bicycle communication system in accordance with a first illustrative embodiment.

Referring initially to FIG. 1, a bicycle communication system 10 is illustrated in accordance with a first embodiment. The bicycle communication system 10 comprises a front camera 12, a cycle computer 14, a front derailleur 16, a front shifting operating device 18, a rear camera 20, a rear derailleur 22, a rear shifting operating device 24, a suspension 26, a suspension operating unit 28, a connection control apparatus 30 and a power source 32. The front camera 12, the cycle computer 14, the front derailleur 16, the front shifting operating device 18, the rear camera 20, the rear derailleur 22, the rear shifting operating device 24, the suspension 26 and the suspension operating unit 28 are examples of bicycle components.

The connection control apparatus 30 is configured to control a connection state between the above mentioned bicycle components. In the first embodiment, the front camera 12 is one example of a first component (i.e., a first bicycle component) that is configured to be mounted to a bicycle. The cycle computer 14 is one example of a second component (i.e., a second bicycle component) that is configured to be mounted to a bicycle. The front derailleur 16 is one example of a third component (i.e., a third bicycle component) that is configured to be mounted to a bicycle. The front shifting operating device 18 is one example of a fourth component (i.e., a fourth bicycle component) that is configured to be mounted to a bicycle. Additionally, the rear derailleur 22, the rear shifting operating device 24, the suspension 26, and the suspension operating unit 28 are examples of the other components (i.e., other bicycle components) that are configured to be mounted to a bicycle.

Figure 2:
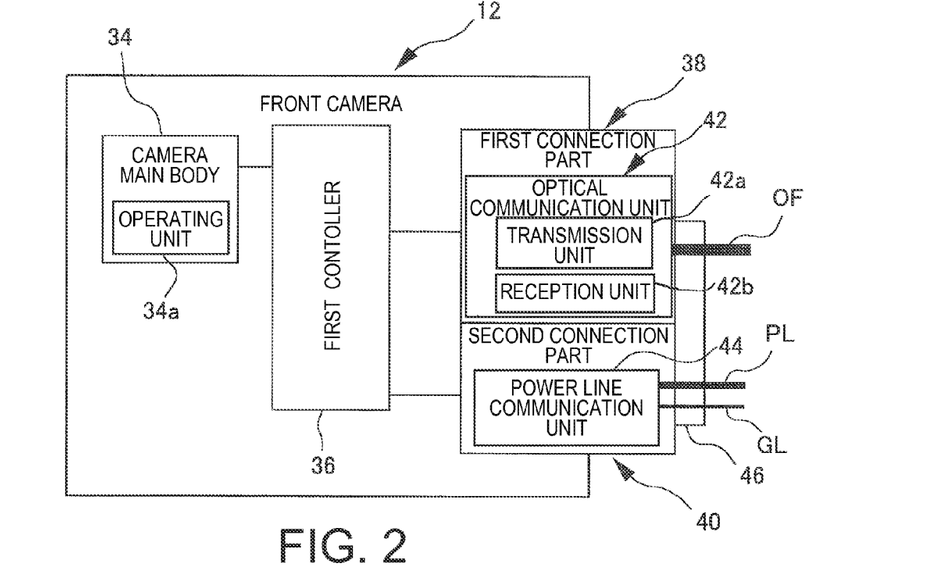
FIG. 2 is a block diagram schematically illustrating a basic bicycle component configuration of a front camera of the bicycle communication system illustrated in FIG. 1.

Each of the bicycle components 12 to 28 and the connection control apparatus 30 are connected by one of two types of cords, i.e., either a first cord 8a or a second cord 8b. The first cord 8a comprises an optical fiber cable comprising an optical fiber OF, as well as an electrical cable that includes a power line PL and a ground line GL. The second cord 8b comprises an electrical cable that includes a power line PL and a ground line GL. In FIG. 2, the optical fiber OF is illustrated as being the thickest, the ground line GL is illustrated as being the thinnest, and the power line PL is illustrated as having an intermediate thickness. The power source 32 is, for example, a DC power source comprising a primary battery and a secondary battery. The power source 32 is electrically connected to either each of the bicycle components 12, 14, 16, 18, 20, 22, 24, 26 and 28, or the connection control apparatus 30. In the present embodiment, the power source 32 is electrically connected directly to the connection control apparatus 30.

The front camera 12 is configured to be mounted, for example, to a handlebar of a bicycle. The front camera 12 is capable of photographing a front area located in front of the bicycle. As shown in FIG. 2, the front camera 12 comprises a camera main body 34, a first controller 36, a first connection part 38 and a second connection part 40. The first controller 36 is one example of a controller. The front camera 12 is, for example, a digital camera. The camera main body 34 comprising an operating unit 34a. The camera main body 34 is configured to capture a still image and/or a video. The camera main body 34 is configured to output an image signal of a prescribed format, along with audio, via a communication operation executed by the operating unit 34a.

Figure 6:
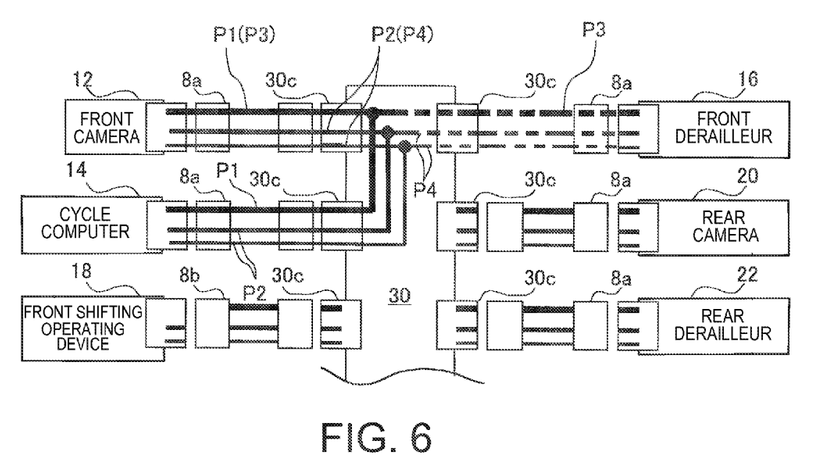
FIG. 6 is a flowchart illustrating a control operation executed by the communication system illustrated in FIG. 1.

The first connection part 38 is connected to a first transmission path P1 that transmits electromagnetic waves, as shown in FIG. 6. In the present embodiment, the first transmission path P1 transmits, for example, light that is outside of the visible light spectrum as an electromagnetic wave. In FIG. 6, the first transmission path P1 is shown by the solid line. As shown in FIG. 2, the first connection part 38 comprises an optical communication unit 42 for conducting optical communications with the other bicycle components, for example, the front derailleur 16, via the first transmission path P1 (refer to FIG. 6). The optical communication unit 42 comprises a transmission unit 42a and a reception unit 42b. The transmission unit 42a converts an electrical signal that has been output from the first controller 36 into an optical signal and transmits the optical signal to the other bicycle components. Upon receiving an optical signal from the other bicycle components, the reception unit 42b converts the signal into an electrical signal, which is input into the first controller 36. The second connection part 40 is connected to a second transmission path P2 that transmits electricity, as shown in FIG. 6. In FIG. 6, the second transmission path P2 is also shown by the solid line. As shown in FIG. 2, the second connection part 40 comprises a power line communication unit 44 for conducting power line communication with the other bicycle components, for example, a cycle computer 14, via the second transmission path P2 (refer to FIG. 6). A connector 46 is provided to the first connection part 38 and the second connection part 40 for collectively connecting the optical fiber OF, the power line PL and the ground line GL of the first cord 8a to the first connection part 38 and the second connection part 40.

The first controller 36 is formed of a microprocessor comprising, for example, a central processing unit (at least one processor), an input/output interface, and memory (at least one memory device). The camera main body 34, the first connection part 38 and the second connection part 40 are electrically connected to the first controller 36. The first controller 36 is configured to establish a communication path with the other bicycle components in the first transmission path P1 by communicating with the other bicycle components via the second transmission path P2. In the present embodiment, the first controller 36 can transmit a request regarding the establishment of a communication path to the other bicycle components via the second transmission path P2. The first controller 36 can establish a communication path in the first transmission path P1 upon receiving permission for this request from the other bicycle components. The first controller 36 can communicate with the other bicycle components via an established communication path.

Figure 3:
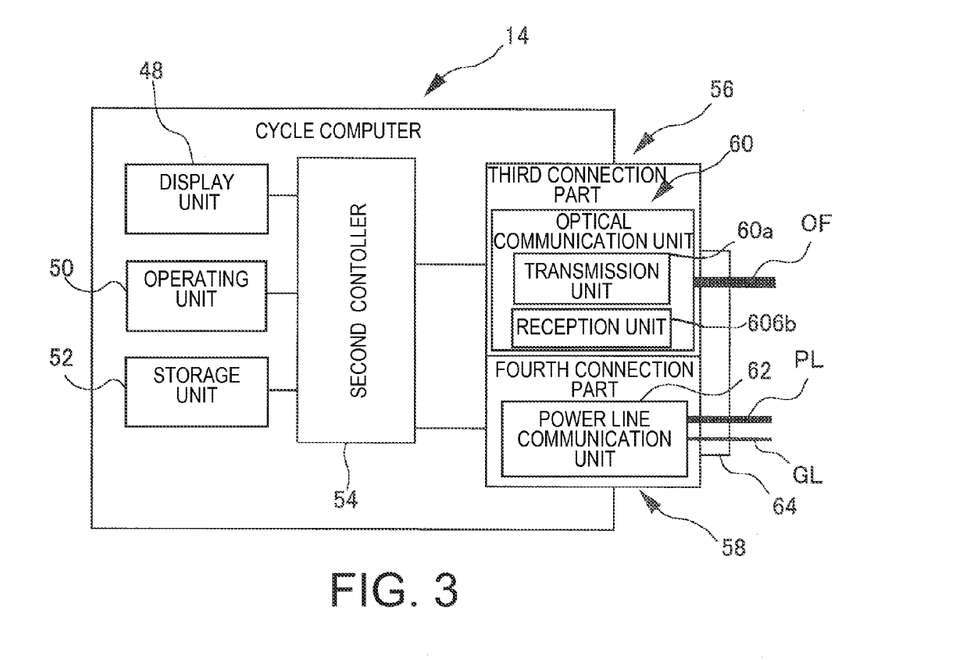
FIG. 3 is a block diagram schematically illustrating a basic bicycle component configuration of a cycle computer of the bicycle communication system illustrated in FIG. 1.

The cycle computer 14 is configured to be mounted, for example, to a handlebar of a bicycle. In addition to the normal functions of a cycle computer, such as displaying the bicycle speed, the travel distance, and the shift position of the bicycle, the cycle computer 14 can also display images that are captured by the front camera 12 and the rear camera 20. As shown in FIG. 3, the cycle computer 14 comprises a display unit 48, an operating unit 50, a storage unit 52, a second controller 54, a third connection part 56 and a fourth connection part 58. The display unit 48 is, for example, a liquid crystal display that can be touch operated and that is able to display an image. The operating unit 50 comprises at least one operating member and a touch operating unit of the display unit 48. Preferably, the storage unit 52 is comprised of, for example, nonvolatile flash memory. Storing image information that is captured by the front camera 12 and the rear camera 20 to the storage unit 52, in addition to various kinds of information including a control program, is possible.

The third connection part 56 is connected to the first transmission path P1 that transmits electromagnetic waves, as shown in FIG. 6. As shown in FIG. 3, the third connection part 56 comprises an optical communication unit 60 for conducting optical communication with the other bicycle components, for example, the front camera 12, via the first transmission path P1 (refer to FIG. 6). The optical communication unit 60 has the same configuration as the optical communication unit 42 of the front camera and comprises a transmission unit 60a that transmits optical signals to the other bicycle components and a reception unit 60b that receives optical signals from the other bicycle components. The fourth connection part 58 is connected to a second transmission path P2 that transmits electricity, as shown in FIG. 6. As shown in FIG. 3, the fourth connection part 58 comprises a power line communication unit 62 for conducting power line communication with other bicycle components, for example, a front camera 12, via the second transmission path P2 (refer to FIG. 6). A connector 64 is provided to the third connection part 56 and the fourth connection part 58 that can collectively connect the optical fiber OF, the power line PL and the ground line GL of the first cord 8a to the third connection part 56 and the fourth connection part 58.

The second controller 54 is formed of a microprocessor comprising, for example, a central processing unit (at least one processor), an input/output interface, and memory (at least one memory device). A display unit 48, an operating unit 50, a storage unit 52, a third connection part 56, and a fourth connection part 58 are connected to the second controller 54. The second controller 54 is configured to establish a communication path with the other bicycle components in the first transmission path P1 by communicating with the other bicycle components via the second transmission path P2. In the present embodiment, the second controller 54 is configured to establish a communication path with the front camera 12 in the first transmission path P1.

Figure 4:
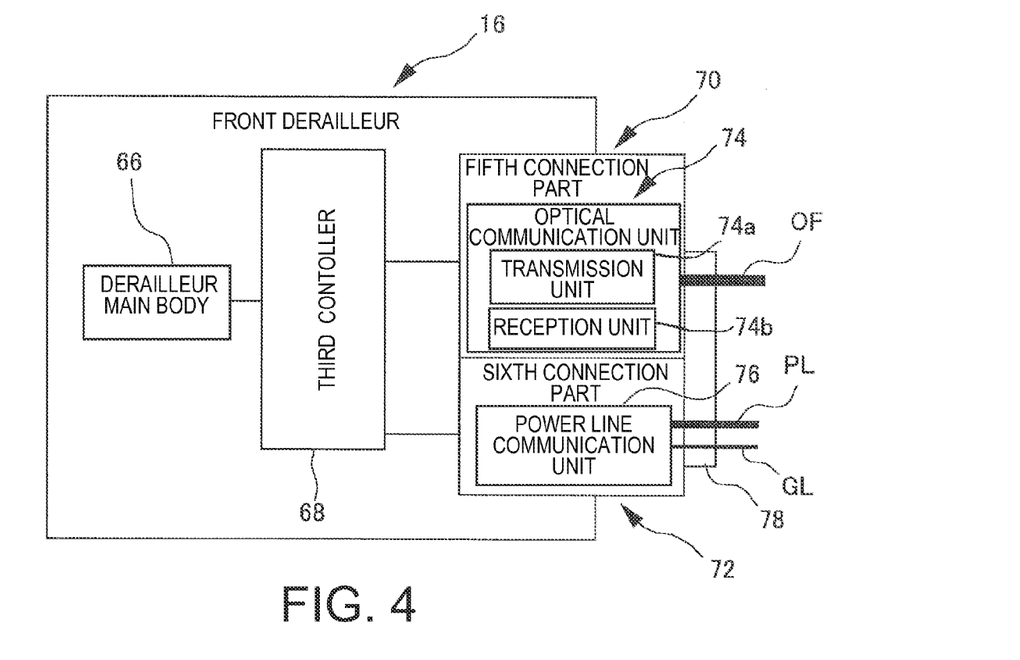
FIG. 4 is a block diagram schematically illustrating a basic bicycle component configuration of a front derailleur of the bicycle communication system illustrated in FIG. 1.

The front derailleur 16 is configured to be mounted, for example, to the bicycle frame. The front derailleur 16 comprises a derailleur main body 66, a third controller 68, a fifth connection part 70 and a sixth connection part 72, as shown in FIG. 4. The derailleur main body 66 comprises an electric actuator for moving a chain guide, which is not diagrammed, in a direction coming into and out of contact with the frame, as well as a shift position sensor for detecting the shift position.

The fifth connection part 70 is connected to a third transmission path P3 that transmits electromagnetic waves, as shown in FIG. 6. In the present embodiment, the third transmission path P3 transmits light as an electromagnetic wave. in FIG. 6, the third transmission path P3 is shown by the solid tine and the double-dashed line. As shown in FIG. 4, the fifth connection part 70 comprises an optical communication unit 74 for conducting optical communication with the other bicycle components, for example, the front camera 12, via the third transmission path P3 (refer to FIG. 6). The optical communication unit 74 has the same configuration as the optical communication unit 42 of the front camera 12 and comprises a transmission unit 74a that transmits optical signals to the other bicycle components and a reception unit 74b that receives optical signals from the other bicycle components. The sixth connection part 72 is connected to a fourth transmission path P4 that transmits electricity, as shown in FIG. 6. In FIG. 6, the fourth transmission path P4 is shown by the solid line and the chained, double-dashed line. As shown in FIG. 4, the sixth connection part 72 comprises a power line communication unit 76 for conducting power line communication with the other bicycle components, for example, a front camera 12, via the fourth transmission path P4 (refer to FIG. 6). A connector 78 is provided to the fifth connection part 70 and the sixth connection part 72 for collectively connecting the optical fiber OF, the power line PL and the ground line GL of the first cord 8a to the fifth connection part 70 and the sixth connection part 72.

The third controller 68 is formed of a microprocessor comprising, for example, a central processing unit (at least one processor), an input/output interface, and memory (at least one memory device). A derailleur main body 66 is connected to the third controller 68. The third controller 68 is configured to establish a communicating with the other bicycle components in the third transmission path P3 by communicating with the other bicycle components via the fourth transmission path P4. In the present embodiment, the third controller 68 is configured to establish a communication path with the front camera 12 in the third transmission path P3.

Here, in FIG. 6, at least a part of the first transmission path P1 and the third transmission path P3 overlaps, and at least a part of the second transmission path P2 and the fourth transmission path P4 overlaps. In FIG. 6, the portion where the first transmission path P1 and the third transmission path P3 overlap, as well as the portion where the second transmission path P2 and the fourth transmission path P4 overlap, are indicated by solid lines.

Figure 5:
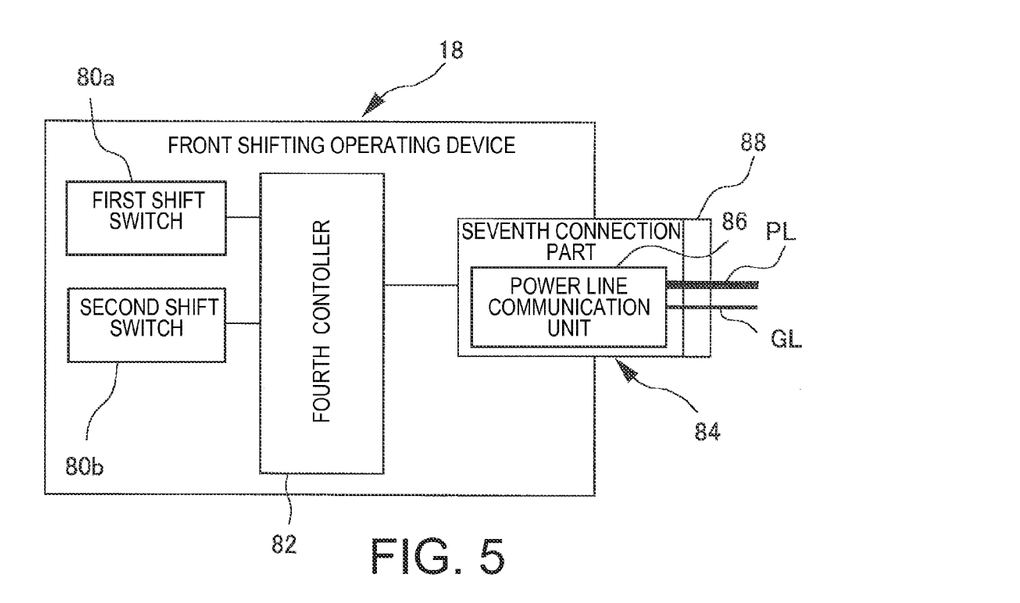
FIG. 5 is a block diagram schematically illustrating a basic bicycle component configuration of a front shifting operating device of the bicycle communication system illustrated in FIG. 1.
Figure 7:
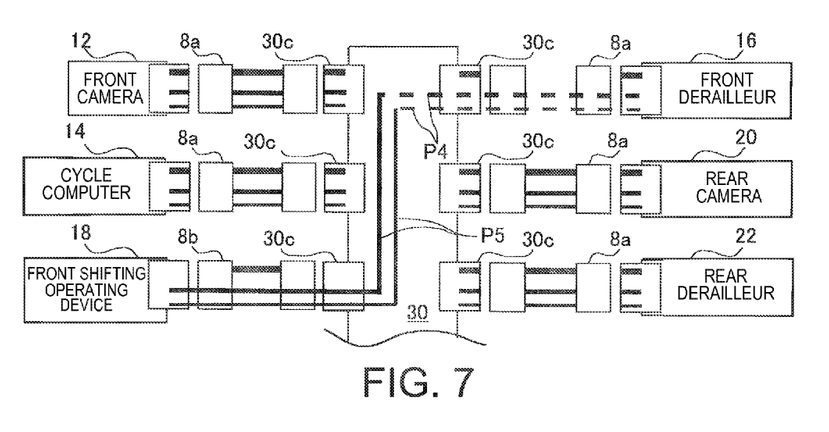
FIG. 7 is a diagram showing a first example of the control operation executed by the bicycle communication system illustrated in FIG. 1.

The front shifting operating device 18 is configured to be mounted, for example, to a handlebar of a bicycle in order to shift the front derailleur 16, as shown in FIG. 5. The front shifting operating device 18, unlike the components described above, does not comprise a connection part that is connected to a transmission path that transmits electromagnetic waves. The front shifting operating device 18 comprises a first shift switch 80a, a second shift switch 80b, a fourth controller 82 and a seventh connection part 84. The fourth controller 82 generates an upshift signal for upshifting the front derailleur 16 when the first shift switch 80a is operated. The fourth controller 82 generates a downshift signal for downshifting the front derailleur 16 when the second shift switch 80b is operated. The seventh connection part 84 is connected to a fifth transmission path P5 that transmits electricity, as shown in FIG. 7. As shown in FIG. 5, the seventh connection part 84 comprises a power line communication unit 86 for conducting power line communication with the other bicycle components, for example, the front derailleur 16, via the fifth transmission path P5 (refer to FIG. 7). A connector 88 is provided to the seventh connection part 84 for collectively connecting the power tine PL and the ground line GL of the second cord 8b. The connector 88 has the same shape as the connectors 46, 64, and 78.

The fourth controller 82 is formed of a microprocessor comprising, for example, a central processing unit (at least one processor), an input/output interface, and memory (at least one memory device). A first shift switch 80a, a second shift switch 80b, and a seventh connection part 84 are connected to the fourth controller 82. The fourth controller 82 provides a signal for operating the front derailleur 16 via a fifth transmission path P5 to the front derailleur 16, by communicating with other bicycle components, such as the front derailleur 16, which is configured to be mounted to a bicycle. At least apart of the fifth transmission path P5 overlaps with at least either the second transmission path P2 or the fourth transmission path P4. In the present embodiment, a part of the fifth transmission path P5 overlaps with the fourth transmission path P4, as shown by the dashed tine in FIG. 7.

The configuration regarding the connection parts of the rear derailleur 22 is substantially the same as that of the front derailleur 16. Thus, the rear derailleur comprises a connection part that is connected to a transmission path that transmits electricity and a connection part that is connected to a transmission path that transmits electromagnetic waves.

The configuration regarding the connection parts of the rear shifting operating device 24 is substantially the same as that of the front shifting operating device 18. The rear shifting operating device 24 comprises a connection part that is connected to a transmission path that transmits electricity and not comprising a connection part that is connected to the transmission path that transmits electromagnetic waves.

The configuration regarding the connection parts of the suspension 26 is substantially the same as that of the front derailleur 16. The suspension 26 comprises a connection part that is connected to a transmission path that transmits electricity and a connection part that is connected to a transmission path that transmits electromagnetic waves.

The configuration regarding the connection parts of the suspension operating unit 28 is substantially the same as that of the front shifting operating device 18. The suspension operating unit 28 comprises a connection part that is connected to a transmission path that transmits electricity and not comprising a connection part that is connected to the transmission path that transmits electromagnetic waves.

As shown in FIG. 1, the connection control apparatus 30 comprises a connection mechanism 30a and a connection controller 30b. The connection mechanism 30a comprises a plurality of connection terminals 30c that can be connected to each of the first connection part 38 to the seventh connection part 84, as well as to the connection parts of the other bicycle components. The connection terminals 30c are terminals for the optical fiber OF, the power line PL, and the ground line GL. The connection mechanism 30a comprises an optical switch 30d that can switch the optical connection state between the plurality of bicycle components. The optical switch 30d is, for example, a MEMS (Micro Electro Mechanical Systems) optical switch. The connection controller 30b controls the optical switch 30d so that a communication path between the components at the communication source and the components at the communication destination is established in each transmission path. The details of the operation of the connection controller 30b will be described below.

The operation of the controller of each component at the time of communication will be described using the first controller 36 of the front camera 12 as an example. The control operation shown in FIG. 8 is one example, and the present invention is not limited to the control operation shown in FIG. 8.

Figure 8:
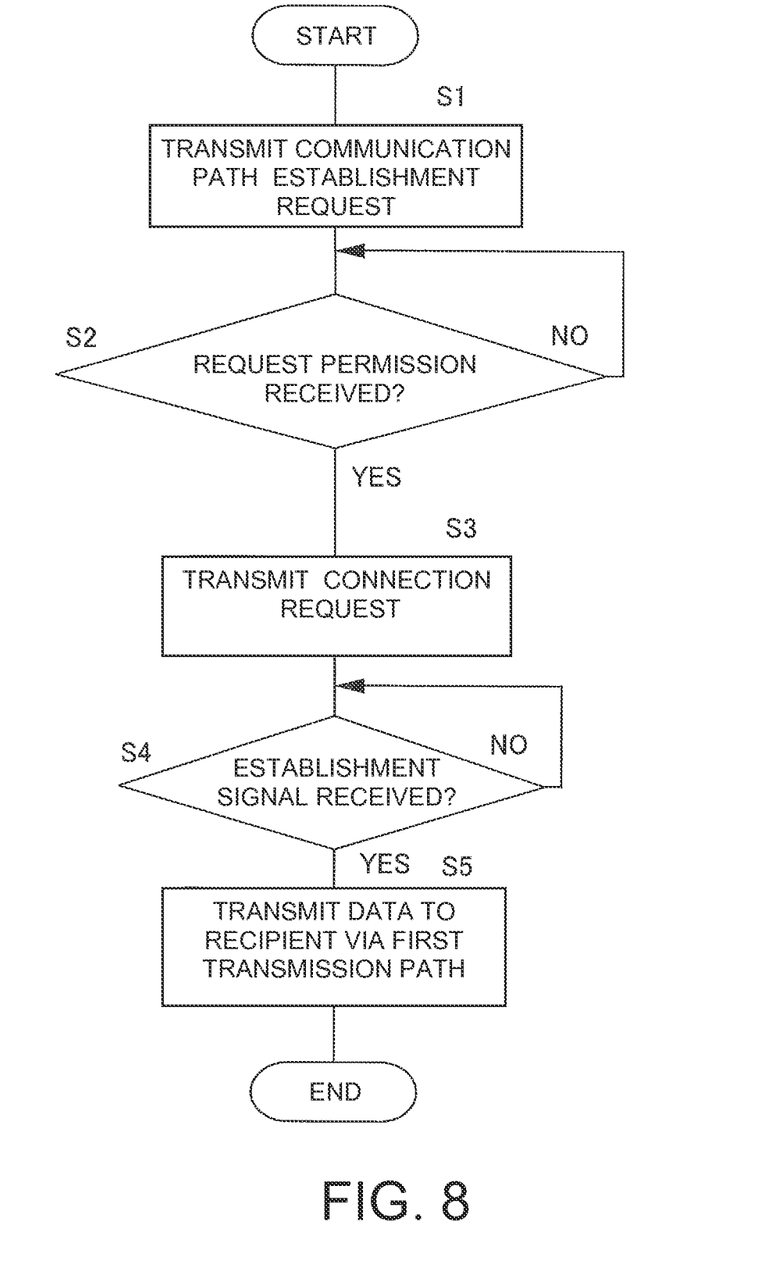
FIG. 8 is a diagram showing a second example of the control operation executed by the bicycle communication system illustrated in FIG. 1.

FIG. 8 shows an example in which the front camera 12 and the cycle computer 14 communicate. In step S1 in FIG. 8, the first controller 36 transmits a request regarding the establishment of a communication path to the cycle computer 14 via the second transmission path P2. Usually, when receiving a request regarding the establishment of a communication path, the second controller 54 of the cycle computer 14 transmits a signal for permitting the establishment of a communication path to the first controller 36 via the second transmission path P2. In step S2, the first controller 36 waits to receive the signal for permitting the establishment of a communication path from the second controller 54. Upon receiving a communication permission signal from the second controller 54, the first controller 36 advances the operation from step S2 to step S3. In step S3, the first controller 36 transmits a connection request to establish a communication path with the cycle computer 14 in the first transmission path P1 to the connection control apparatus 30 via the second transmission path P2. The connection controller 30b thereby controls the optical switch 30d of the connection mechanism 30a, and the first transmission path P1 is established. When the first transmission path P1 is established, the connection controller 30b transmits an establishment signal, indicating that the first transmission path P1 has been established, to the controller that transmitted the connection request signal, in this case the first controller 36, via the second transmission path P2. In step S4, the first controller 36 waits to receive an establishment signal. Upon receiving the establishment signal, the first controller 36 advances the operation from step S4 to step S5 and transmits, for example, image data to the cycle computer 14 via the established first transmission path P1. The second controller 54 of the cycle computer 14, for example, displays the transmitted data on the display unit 48 or stores the transmitted data in the storage unit 52.

Here, communicating signals via the first transmission path P1 after establishing communication with the other bicycle components in the first transmission path P1 is possible via the second transmission path P2. Accordingly, highspeed communication becomes possible in the bicycle components.

Second Embodiment

In the second embodiment, a signal for establishing a communication path between each component is transmitted by wireless communication instead of power line communication.

Figure 9:
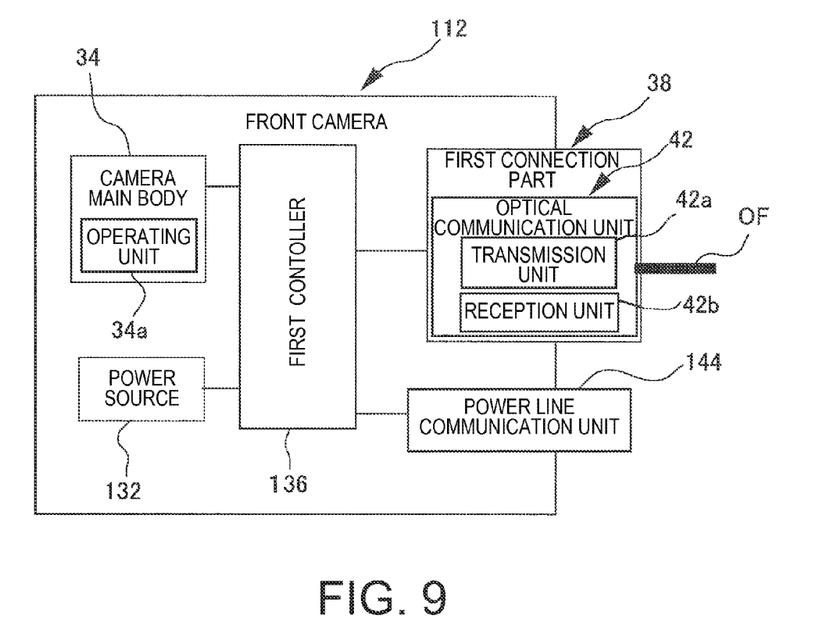
FIG. 9 is a block diagram, similar to FIG. 2, schematically illustrating a basic bicycle component configuration of a front camera of a second embodiment of in accordance with a first illustrative embodiment.

In FIG. 9, the front camera 112 comprises a camera main body 34, a first controller 136, a first connection part 38, a wireless communication unit 144 and a power source 132. The configurations of the camera main body 34, the first controller 136, and the first connection part 38 are the same as those in the first embodiment. Thus, the descriptions of the camera main body 34, the first controller 136, and the first connection part 38 have been omitted. The wireless communication unit 144 wirelessly transmits to the other bicycle components a request regarding the establishment of a communication path for establishing a communication path with the other bicycle components, according to a signal from the first controller 136, in accordance with short-range wireless communication standards, such as IEEE 802.15.4 and IEEE 802.15.1. Therefore, the control operation of the first controller 136 is different only in the point that the transmission and the reception is via the wireless communication unit 144 instead of the transmission and the reception occurring via the second transmission path P2 by the power line communication unit 44. The power source 132 is a DC power source comprising a primary battery and a secondary battery.

Figure 10:
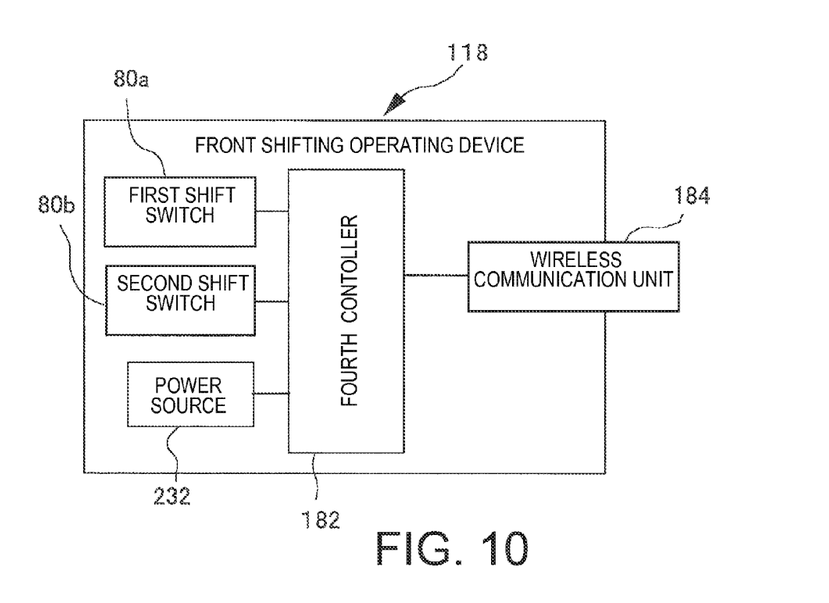
FIG. 10 is a block diagram, similar to FIG. 5, schematically illustrating a basic bicycle component configuration of a front gear shift operating unit of the second embodiment.

In FIG. 10, the front shifting operating device 118 comprises a first shift switch 80a, as well as a second shift switch 80b, a fourth controller 182, a wireless communication unit 184, and a power source 232. The configurations of the first shift switch 80a, the second shift switch 80b, and the fourth controller 182 are the same as those in the first embodiment. Thus, the descriptions of the first shift switch 80a, the second shift switch 80b, and the fourth controller 182 have been omitted. The wireless communication unit 184 has the same configuration as the wireless communication unit 144. The power source 232 has the same configuration as the power source 132. The fourth controller 182 transmits a shifting signal to the front derailleur 16 via the wireless communication unit 184.

The control configuration of the front derailleur, the cycle computer, the rear camera, and the rear derailleur having the wireless communication unit is the same as that of the front camera 112. Thus, the descriptions of the front derailleur, the cycle computer, the rear camera, and the rear derailleur have been omitted. Additionally, the control configurations of the rear shifting operating device, the suspension, and the suspension operating unit having the wireless communication unit are the same as that of the front shifting operating device 118; thus, the descriptions of the rear shifting operating device, the suspension, and the suspension operating unit have been omitted.

In the second embodiment, a communication path is wirelessly established on a transmission path that transmits electromagnetic waves. Therefore, the electric wiring work becomes easier than in the first embodiment.

Other Embodiments

One embodiment of the present invention was described above, but the present invention is not limited to the above-described embodiment; various modifications can be made without departing from the scope of the invention. In particular, the various embodiments and modified examples described in the present Specification can be freely combined according to necessity.

(a) In the first embodiment, only an operation to establish an optical communication path with the second transmission path P2 and the fourth transmission path P4 is conducted, but the present invention is not limited thereto. For example, when not comprising a connection part that is connected to a transmission path that transmits electromagnetic waves, information to control the components may be communicated to the second transmission path P2 and the fourth transmission path P4. Additionally, even when comprising a connection part that is connected to a transmission path that transmits electromagnetic waves, information may be communicated to the second transmission path P2 and the fourth transmission path P4 when the data amount is small.

(b) In the first and the second embodiments, light outside of the visible light spectrum was discussed as an example of an electromagnetic wave, but the electromagnetic wave is not limited to light. For example, the electromagnetic wave may be light within the visible light spectrum.

(c) In the first embodiment, the front camera 12 as an example of the first component, the cycle computer 14 as an example of the second component, and a front derailleur as an example of the third component were described; however, the present invention is not limited thereto. The first to the third components may be applied to all of the components that have a connecting part that is connected to a transmission path that transmits electromagnetic waves, as well as a connecting part that is connected to a transmission path that transmits electricity.

(d) In the first embodiment, an example of the communication between the front camera 12 and the cycle computer 14 was described, but the present invention is not limited thereto. For example, the front camera 12 and the front derailleur 16 may also communicate. In this case, the third controller 68 of the front derailleur 16 may be configured to analyze image data (including still image data and video data) that have been transmitted from the front camera 12 and to control the shift operation of the derailleur main body 66 based on the results thereof. Specifically, when a determination is made as a result of analyzing the image data that the bicycle is traveling on a flat road while accelerating, the third controller 68 may control the derailleur main body 66 to increase the gear ratio of the bicycle. Additionally, when a determination is made as a result of analyzing the image data that the bicycle will reach an ascending hill in the near future or that the bicycle is currently traveling uphill, the third controller 68 may control the derailleur main body 66 to decrease the gear ratio of the bicycle. The same also applies to the rear derailleur 22.

(e) In the first embodiment, an example of the communication between the front camera 12 and the cycle computer 14 was described, but the present invention is not limited thereto. For example, the front camera 12 and the suspension 26 may also communicate. In this case, the third controller of the suspension 26 may be configured to analyze image data (including stilt image data and video data) that are transmitted from the front camera 12 and to control the operating state of the suspension 26 based on the results thereof. Specifically, when a determination is made as a result of analyzing the image data that the bicycle is traveling on a flat road while accelerating, the controller of the suspension 26 may control the suspension 26 to be in a lockout state. Additionally, when a determination is made as a result of analyzing the image data that the bicycle will reach an ascending hill in the near future or that the bicycle is currently traveling uphill, the controller of the suspension 26 may control the suspension 26 to be in an operating state. The suspension 26 may comprise front suspension and rear suspension.

(f) The components are not limited to those exemplified in the first embodiment and the second embodiment. The components may include any bicycle component that is configured to be mounted to a bicycle and operated by electricity. For example, a saddle that is vertically movable by electricity, a control apparatus for controlling the entire bicycle, and a power source controller for controlling the power source are all included in the components.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated. Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component comprising:
   a controller;
   a first connection part connected to a first transmission path configured to transmit electromagnetic waves; and
   a second connection part connected to a second transmission path configured to transmit electricity,
   the controller being configured to
      transmit a request regarding an establishment of a communication path to other bicycle components via the second transmission path,
      establish the communication path in the first transmission path upon receiving permission for the request from the other bicycle components, and communicate with the other bicycle components via the established communication path.

2. The bicycle component as recited in claim 1, wherein the first connection part comprises an optical communication unit configured to conduct optical communication with the other bicycle components via the first transmission path.

3. The bicycle component as recited in claim 2, wherein the optical communication unit comprises a light transmission unit configured to transmit light to the other bicycle components and a light reception unit configured to receive light from the other bicycle components.

4. The bicycle component as recited in claim 1, wherein the second connection part comprises a power line communication unit configured to conduct power line communication with the other bicycle components via the second transmission path.

5. A bicycle component comprising:
a controller;
a first connection part connected to a first transmission path configured to transmit electromagnetic waves; and
a wireless communication unit configured to transmit a wireless signal via a second transmission path,
the controller is configured to
  transmit a request regarding an establishment of a communication path to other bicycle components via the second transmission path,
  establish the communication path in the first transmission path upon receiving permission for the request from the other bicycle components, and
  communicate with the other bicycle components via the established communication path.

6. A bicycle communication system comprising:
a first bicycle component comprising a first controller, a first connection part that is connected to a first transmission path configured to transmit electromagnetic waves, and a second connection part that is connected to a second transmission path configured to transmit electricity; and
a second bicycle component comprising a second controller, a third connection part that is connected to the first transmission path, and a fourth connection part that is connected to the second transmission path;
one of the first and second controllers configured to
  transmit a request regarding an establishment of a communication path to the other of the first and second controllers via the second transmission path,
  establish the communication path in the first transmission path upon receiving permission for the request from the other of the first and second controllers, and
  communicate with the other of the first and second controllers via e established communication path.

7. The bicycle communication system as recited in claim 6, further comprising
a third bicycle component comprising a third controller, a fifth connection part that is connected to a third transmission path configured to transmit electromagnetic waves, and a sixth connection part that is connected to a fourth transmission path configured to transmit electricity; and
a communication path may be established in the first or the third transmission path, with one the first, second and third controllers communicating with another of the first, second and third controllers via the second or the fourth transmission path.

8. The bicycle communication system as recited in claim 7, wherein
at least a part of the first transmission path and the third transmission path overlap.

9. The bicycle communication system as recited in claim 7, wherein
at least a part of the second transmission path and the fourth transmission path overlap.

10. The bicycle communication system as recited in claim 7, further comprising
a connection mechanism configured to connect to each of the first to sixth connection parts, and
a connection control apparatus comprising a connection controller configured to control the connection state between the first, second and third bicycle components.

11. The bicycle communication system as recited in claim 7, further comprising
a fourth bicycle component including a fourth controller and a seventh connection part that is connected to a fifth transmission path configured to transmit electricity; and
the connection mechanism is configured to connect to each of the first to seventh connection parts, and the connection controller controls the connection state between the first to fourth bicycle components.

12. The bicycle communication system as recited in claim 11, wherein
at least a part of the fifth transmission path overlaps with at least one of the second and the fourth transmission paths.

* * * * *